(12) United States Patent
Terafuji (10) Patent No.: US 12,189,704 B2
(45) Date of Patent: Jan. 7, 2025

(54) STORAGE MEDIUM, INFORMATION PROCESSING APPARATUS, AND METHOD FOR PRINTING CODE IMAGE REPRESENTING ADDRESS OF WEB PAGE

(71) Applicant: BROTHER KOGYO KABUSHIKI KAISHA, Nagoya (JP)

(72) Inventor: Ryo Terafuji, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 246 days.

(21) Appl. No.: 17/690,653

(22) Filed: Mar. 9, 2022

(65) Prior Publication Data

US 2022/0297446 A1   Sep. 22, 2022

(30) Foreign Application Priority Data

Mar. 17, 2021  (JP) .................................. 2021-044174

(51) Int. Cl.
| | | |
|---|---|---|
| *G06F 16/955* | (2019.01) | |
| *G06F 16/957* | (2019.01) | |
| *B41J 3/01* | (2006.01) | |
| *B41J 3/407* | (2006.01) | |
| *B41J 3/51* | (2006.01) | |

(52) U.S. Cl.
CPC ...... *G06F 16/9554* (2019.01); *G06F 16/9566* (2019.01); *G06F 16/9577* (2019.01); *B41J 3/01* (2013.01); *B41J 3/4075* (2013.01); *B41J 3/51* (2013.01)

(58) Field of Classification Search
None
See application file for complete search history.

(56) References Cited

U.S. PATENT DOCUMENTS

| 11,630,610 B2* | 4/2023 | Nomiyama | G06F 3/1208 |
|---|---|---|---|
| | | | 358/1.15 |
| 2014/0103108 A1* | 4/2014 | Sun | G06F 16/9554 |
| | | | 235/494 |
| 2019/0028603 A1* | 1/2019 | Mizutani | H04N 1/00336 |
| 2019/0130044 A1 | 5/2019 | Sato et al. | |
| 2019/0132402 A1* | 5/2019 | Sato | G06Q 30/0601 |

FOREIGN PATENT DOCUMENTS

JP   2019-86870 A   6/2019

* cited by examiner

*Primary Examiner* — Thien M Le
*Assistant Examiner* — April A Taylor
(74) *Attorney, Agent, or Firm* — KENEALY VAIDYA LLP (57) ABSTRACT

There is provided a non-transitory computer-readable storage medium storing computer-readable instructions for an information processing apparatus including a processor. The computer-readable instructions, when executed by the processor, cause the information processing apparatus to perform: (a) acquiring an address of a web page currently displayed on a display of the information processing apparatus; (b) generating a code image representing the address acquired in (a); and (c) generating print data for printing the code image generated in (b).

20 Claims, 6 Drawing Sheets

```
<!DOCTYPE html>
<html class="" lang="ja">
<head id="Head1" prefix="og: http://ogp.me/ns# fb: http://ogp.me/ns/fb# article:
http://ogp.me/ns/article#"><meta charset="UTF-8"><meta name="viewport"
content="width=device-width, user-scalable=yes">
<meta content="PRINTER | BRO" property="og:title">
<meta content="article" property="og:type">
<meta content="https://www.bro.co.jp/product/printer/index.aspx" property="og:url">
<meta name="Keywords" content="PRINTER, MULTIFUNCTION PERIPHERAL, LASER PRINTER, INKJET PRINTER">
<link href="https://www.bro.co.jp/product/printer/" rel="canonical">

*
 *

<title> PRINTER | BRO</title>
</head>

<body>
 *
 *
 *
</body>
```

STORAGE MEDIUM, INFORMATION PROCESSING APPARATUS, AND METHOD FOR PRINTING CODE IMAGE REPRESENTING ADDRESS OF WEB PAGE

CROSS REFERENCE TO RELATED APPLICATIONS

This application claims priority from Japanese Patent Application No. 2021-044174 filed Mar. 17, 2021. The entire content of the priority application is incorporated herein by reference.

BACKGROUND

A conventional technique for creating labels utilizes an application for editing images (hereinafter simply called an "image editing application") executed by an information processing apparatus. In the conventional technique, when a user keys in address information (hereinafter simply called a "URL") for a desired web page, the image editing application generates a QR code (hereinafter called a "two-dimensional code") and transmits data for this code to a tape printer. Based on this data, the tape printer creates a label having the two-dimensional code printed thereon. Not that "QR code" is a registered Japanese trademark of DENSO WAVE Incorporated.

SUMMARY

However, in the conventional technique described above, the image editing application generates two-dimensional code information for the two-dimensional code based on a URL directly inputted by the user, and the two-dimensional code is printed on a label based on the two-dimensional code information. Consequently, not only must the user perform the troublesome operation of inputting a URL, but there is also a chance that the user could input the URL incorrectly when the URL is long.

In view of the foregoing, it is an object of the present disclosure to provide a technique for creating a label on which a code image representing address information (a URL, for example) for a web page has been printed, without requiring the user to key in the address information.

In order to attain the above and other objects, according to one aspect, the present disclosure provides a non-transitory computer-readable storage medium storing computer-readable instructions for an information processing apparatus including a processor. The computer-readable instructions, when executed by the processor, cause the information processing apparatus to perform: (a) acquiring an address of a web page currently displayed on a display of the information processing apparatus; (b) generating a code image representing the address acquired in (a); and (c) generating print data for printing the code image generated in (b).

According to another aspect, the present disclosure provides an information processing apparatus including a display and a controller. The controller is configured to perform: (a) acquiring an address of a web page currently displayed on the display of the information processing apparatus; (b) generating a code image representing the address acquired in (a); and (c) generating print data for printing the code image generated in (b).

According to still another aspect, the present disclosure provides a method of generating print data for creating a label. The method includes: (a) acquiring an address of a web page currently displayed on a display of an information processing apparatus; (b) generating a code image representing the address acquired in (a); and (c) generating print data for printing the code image generated in (b).

According to the above aspects, a label on which a code image representing address information for a web page has been printed can be created without requiring the user to key in the address information.

BRIEF DESCRIPTION OF THE DRAWINGS

The particular features and advantages of the embodiment(s) as well as other objects will become apparent from the following description taken in connection with the accompanying drawings, in which.

DETAILED DESCRIPTION

Next, an information processing apparatus according to one embodiment of the present disclosure will be described while referring to the accompanying drawings.

Figure 7:
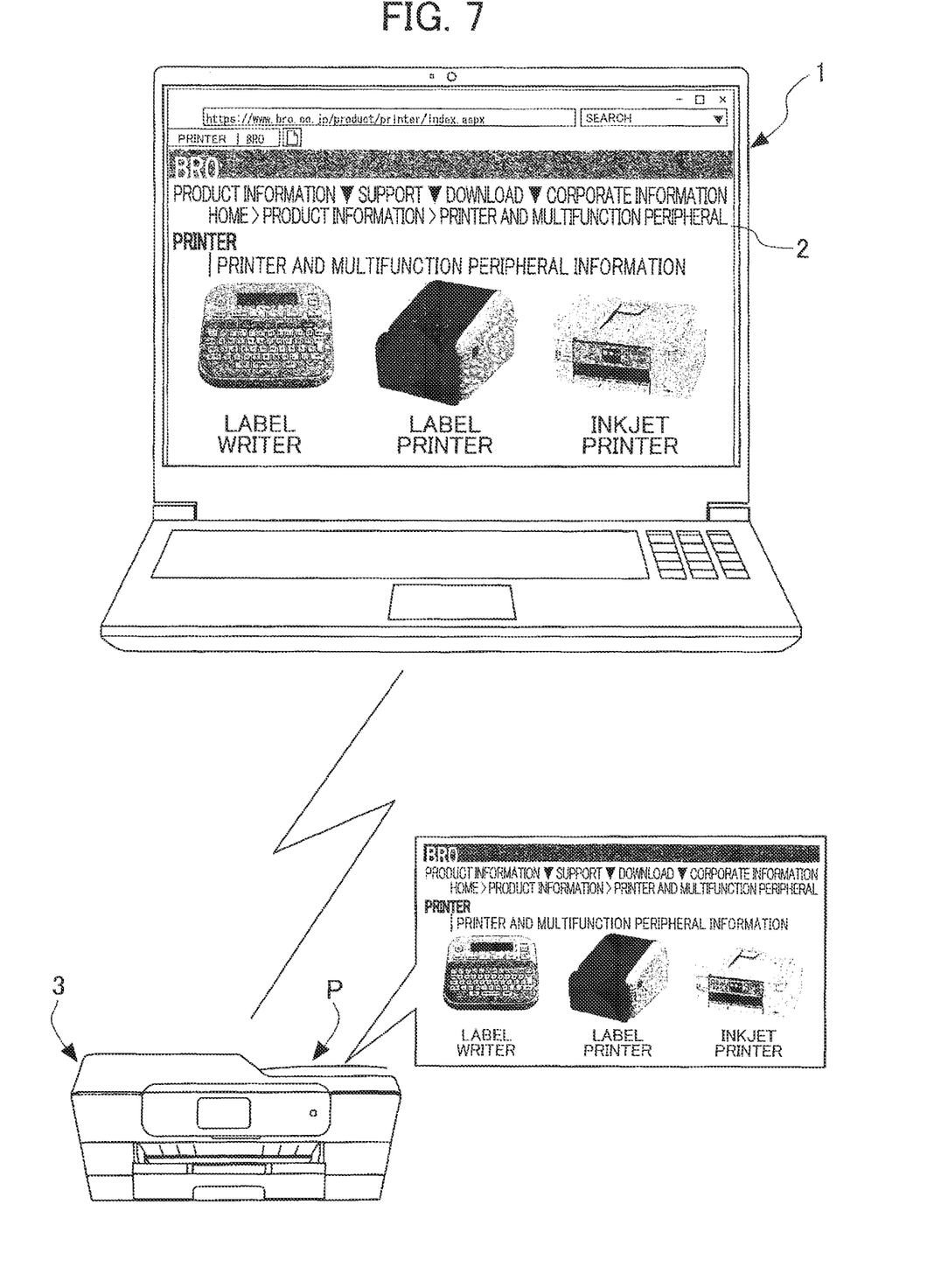
FIG. 7 is an explanatory view of an example of printing a web page using a page printer.

An operation terminal 1 shown in the accompanying drawings is an example of the information processing apparatus according to the embodiment of the present disclosure. FIG. 7 shows a case in which the operation terminal 1 and a printing device 3 are wirelessly connected to each other. For example, the printing device 3 is an inkjet printer or a laser printer. In the case shown in FIG. 7, when printing of a web page displayed on a display unit 2 of the operation terminal 1 is performed using the printing device 3, the printing device 3 prints the web page on a sheet P having a sufficiently large surface area for printing the web page as it is displayed on the display unit 2. Hence, the web page can be printed as it is displayed on the display unit 2. The display unit 2 is an example of the display.

Figure 1:
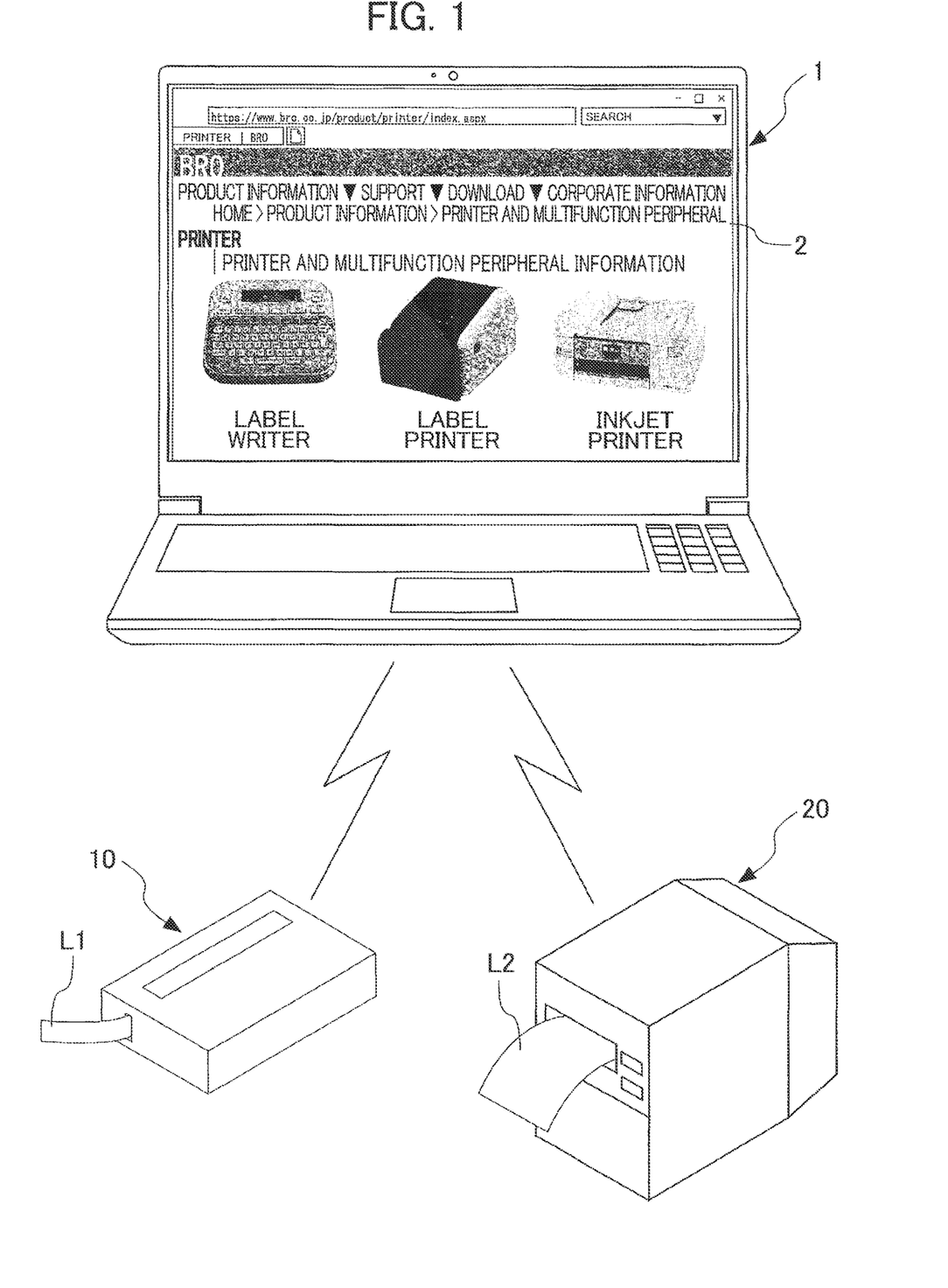
FIG. 1 is an explanatory view of an example of printing address information and the like of a web page using a label printing device.

FIG. 1 shows a case in which the operation terminal 1 is wirelessly connected to printing devices 10 and 20. The printing device 10 is configured to create labels L1 by printing on a tape-like printing medium, while the printing device 20 is configured to create labels L2 by printing on a sheet-like printing medium (die-cut label sheets, for example). Here, both the width of the tape-like printing medium (e.g., the width of a tape) and the size of the sheet-like printing medium (e.g., the size of a die-cut label) are relatively small and have a small printing area. Hence, unlike the printing device 3, the printing devices 10 and 20 cannot print the web page as it is displayed on the display unit 2.

Therefore, for performing printing using a printing device such as the printing device 10 that creates tape-like labels L1 or the printing device 20 that creates sheet-like labels L2, a printing application that includes a label print data creating program is pre-installed on the operation terminal 1. The label print data creating program enables printing suitable for the printing area on each of the labels L1 and L2. The label print data creating program is an example of the computer-readable instructions.

Figure 2:
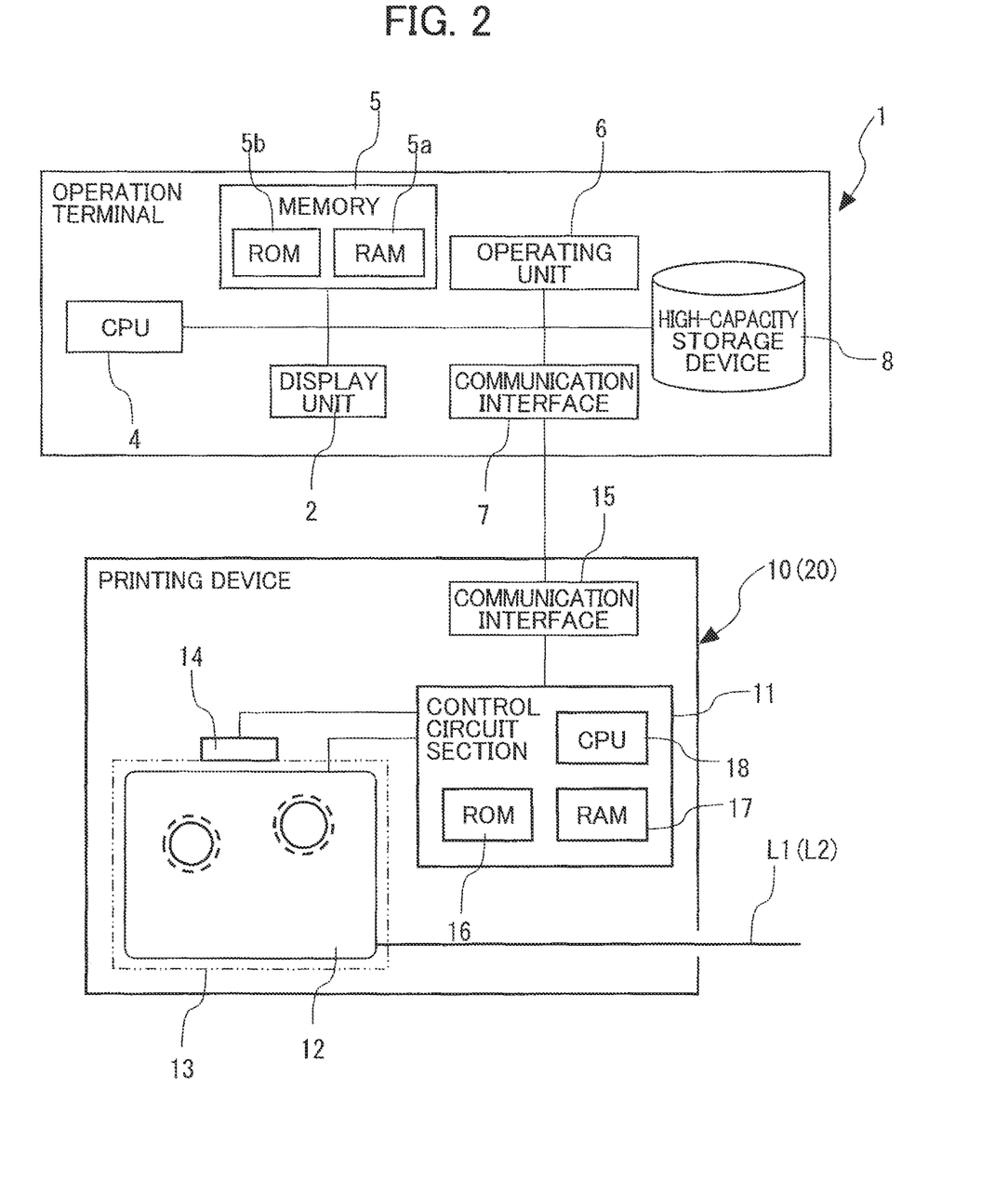
FIG. 2 is a functional block diagram illustrating the functional configurations of an operation terminal and the printing device.

FIG. 2 is a block diagram showing the functional configuration of the operation terminal 1 and the printing device 10 or 20. In addition to the laptop style personal computer shown in FIG. 1, the operation terminal 1 may be any desktop or portable terminal provided with general-purpose computer functions.

The operation terminal 1 is provided with a user interface, a CPU 4, a memory 5, a communication interface 7, and a high-capacity storage device 8. The user interface includes the display unit 2 and an operating unit 6. The memory 5 includes a RAM 5*a*, a ROM 5*b*, and the like. The CPU 4 functions as the controller. The memory 5 and the high-capacity storage device 8 are non-transitory computer-readable storage media. The CPU 4 is an example of the processor and is also an example of the controller.

The operating unit 6 receives input from the user for commands and information. The display unit 2 displays various information and messages for the user. Note that the functions of the operating unit 6 and display unit 2 may be combined in a touchscreen configured to be used independently or together with a keyboard and the like. The communication interface 7 controls the exchange of signals between the operation terminal 1 and the printing devices 3, 10, and 20.

The high-capacity storage device 8 stores an operating system and various programs and information. The ROM 5*b* of the memory 5 stores the label print data creating program for causing the CPU 4 to execute various procedures described later. Note that the label print data creating program may be stored in the high-capacity storage device 8. Further, the high-capacity storage device 8 is not limited to internal memory but may be suitable external memory such as an SD memory card.

The CPU 4 uses the temporary storage function of the RAM 5*a* to perform various processes and to exchange various signals with the printing devices 3, 10, and 20 according to programs pre-stored in the ROM 5*b* or the high-capacity storage device 8. A detailed description of the printing device 3 has been omitted from this specification.

The printing devices 10 and 20 accommodate different types of printing media, but their control systems have substantially the same functions. Therefore, while both the printing device 10 and the printing device 20 may be used in the present embodiment, the following description will focus on use of the printing device 10 unless otherwise specified.

The printing device 10 is provided with a control circuit section 11, a cartridge holder 13, a cartridge sensor 14, and a communication interface 15. A cartridge 12 accommodating a tape-like printing medium is detachably mountable in the cartridge holder 13. In other words, the tape-like printing medium is mountable in the printing device 10. The cartridge sensor 14 is provided on the cartridge holder 13. The control circuit section 11 includes a ROM 16, a RAM 17, and a CPU 18.

The cartridge sensor 14 detects the type of the cartridge 12 according to a suitable method known in the art, such as mechanical detection, or optical or magnetic detection. Information on the types of cartridges 12 in the present embodiment corresponds to the sizes (e.g., the tape widths) of the printing media. For example, the size (e.g., the tape width) of a printing medium accommodated in a cartridge 12 mounted in the printing device 10 can be identified from the type of that cartridge 12.

The control circuit section 11 can exchange information with the operation terminal 1 in a state where the control circuit section 11 is wirelessly connected to the communication interface 7 of the operation terminal 1 via the communication interface 15. Note that the communication interface 15 of the printing device 10 and the communication interface 7 of the operation terminal 1 may be connected to each other through a wired connection instead of a wireless connection.

Next, an example of a process performed by the operation terminal 1 by the CPU 4 executing the label print data creating program will be described with reference to FIG. 3.

Figure 3:
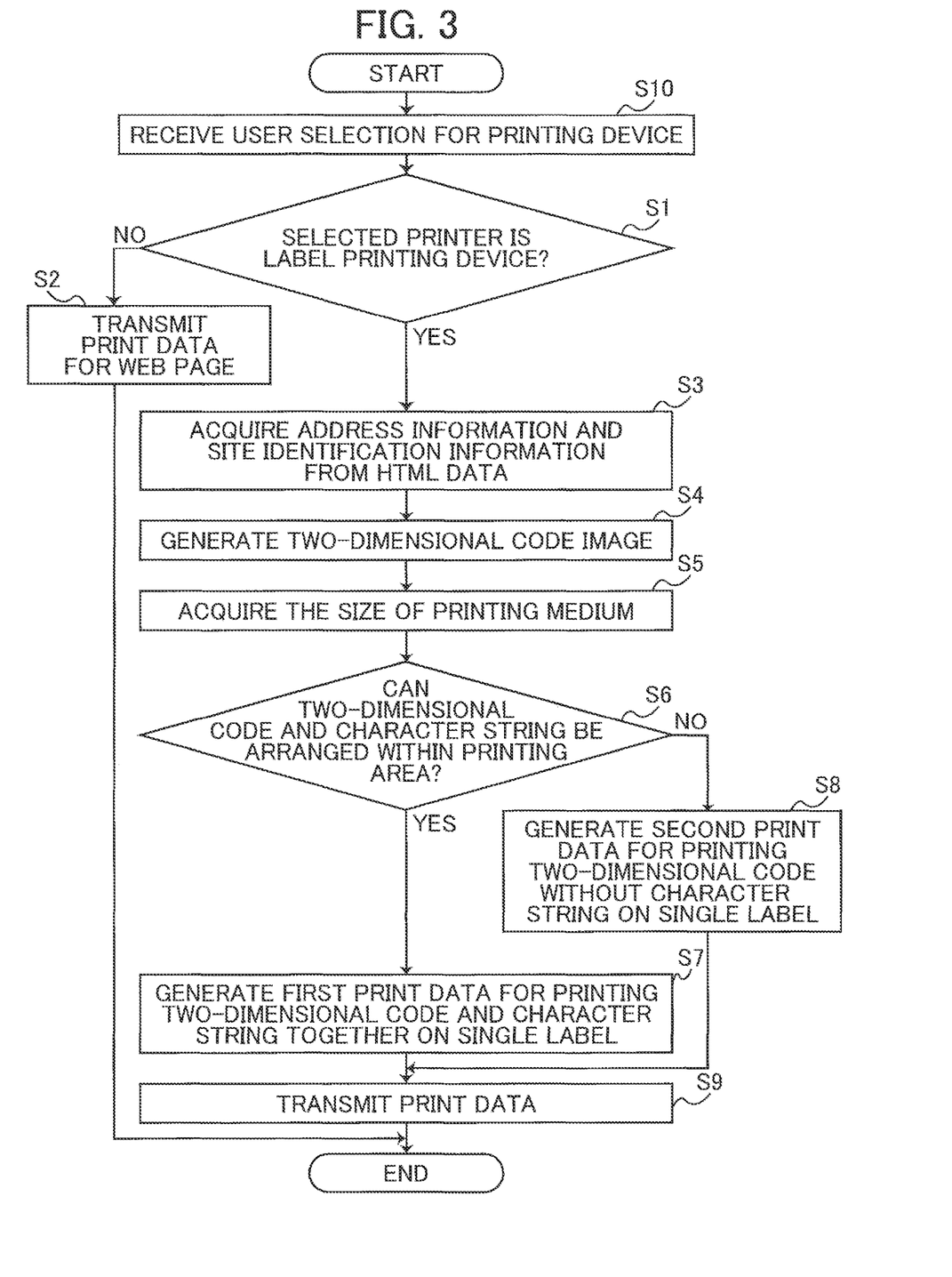
FIG. 3 is a flowchart of a process performed by the operation terminal executing a label print data creating program.

The process in FIG. 3 begins when a prescribed operation for printing a web page displayed on the display unit 2 is performed on the operating unit 6 by the user. In step S10, the CPU 4 of the operation terminal 1 receives a user selection for a printing device to be used to print the web page via the operating unit 6. Note that, in step S10, the user operates the operating unit 6 to select one printing device as the printing device to be used to print the web page from among one or more printing devices connected to the operation terminal 1. In step S1, the CPU 4 of the operation terminal 1 determines whether the printing device selected in S10 is a label printing device such as the printing device 10, the printing device 20, or the like. That is, in step S1 the CPU 4 determines whether the printing device to be used to print the web page is a label printing device.

When the CPU 4 determines that the printing device selected in S10 (i.e., the printing device to be used to print the web page) is not a label printing device (S1: NO), in step S2 the CPU 4 transmits print data for the web page (i.e., print data for printing the image of the web page) to the selected printing device. For example, the print data is transmitted to the printing device 3 if the printing device 3 has been selected as the printing device to be used to print the web page, and subsequently ends the process of FIG. 3. Note that the printing device 3 is not a label printing device. Upon receiving the print data for the web page, the printing device 3 executes a page print, as illustrated in FIG. 7.

However, if the CPU 4 determines in step S1 that the printing device selected in S10 (i.e., the printer to be used to print the web page) is a label printing device (S1: YES), the CPU 4 advances to step S3. In the following description, it is assumed that the CPU 4 determines in step S1 that the printing device selected in S10 is the printing device 10.

Figure 4:
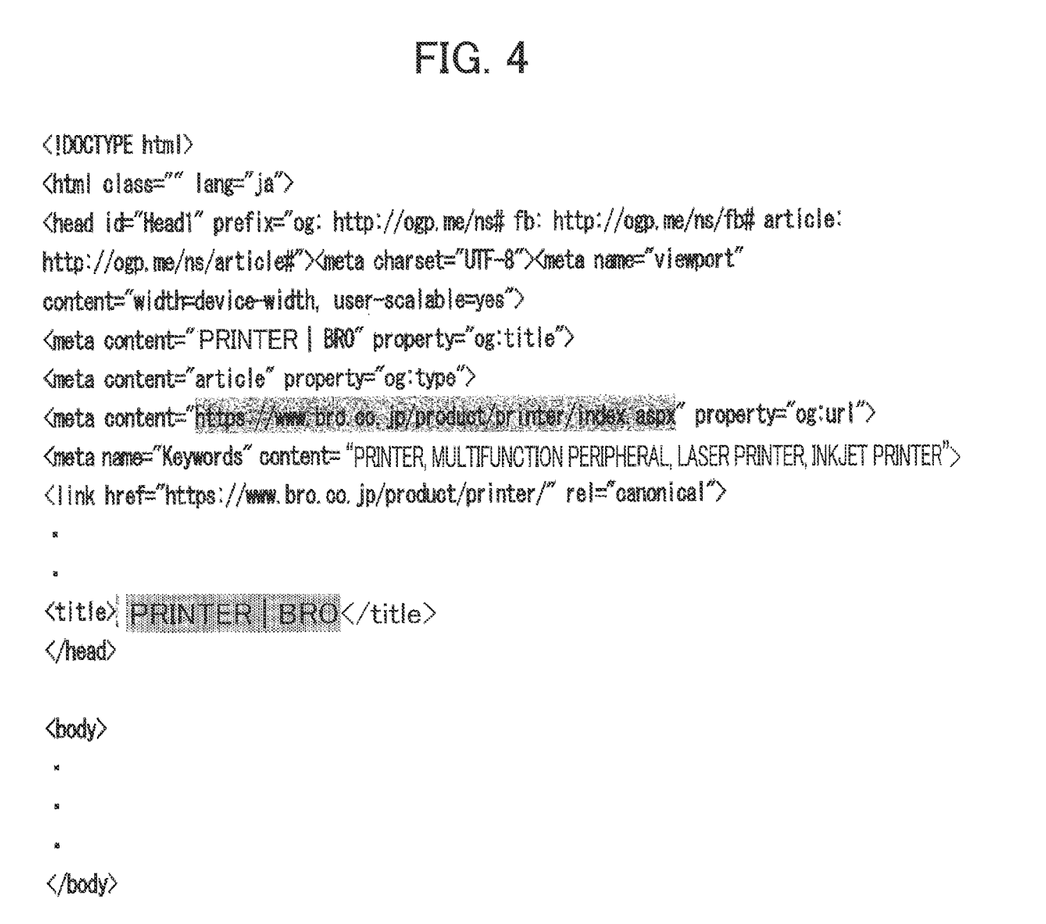
FIG. 4 is an explanatory view of an example of address information and web page identification information included in the HTML data for a web page to be printed.

In step S3, the CPU 4 executes a first acquisition procedure before advancing to step S4. In the first acquisition procedure, the CPU 4 acquires address information and web page identification information for the web page currently displayed on the display unit 2. For example, as shown in FIG. 4, the CPU 4 acquires the address information and the web page identification information from the head information included in the HTML data for the web page currently displayed on the display unit 2. In the present embodiment, the CPU 4 acquires the URL for the web page (i.e., the address of the web page) as the address information, and acquires the title for the web page as the web page identification information. That is, the web page identification information is information for identifying the web page. The web page identification information is an example of the identification information.

As an example, the CPU 4 acquires HTML data through a browser, which is an application for displaying web pages on the display unit 2. At this time, the CPU 4 accesses text information (highlighted in gray in FIG. 4) developed and displayed in suitable locations of the browser as the URL and the title tab and acquires this information as the address information and web page identification information.

In step S4, the CPU 4 executes a code generation procedure. In the code generation procedure, the CPU 4 generates, based on the acquired address information, two-dimensional code image data for a two-dimensional code image representing the address (URL) of the web page. That is, in step 4 the CPU 4 generates a two-dimensional code image representing the address (URL) of the web page. Subsequently, the CPU 4 advances to step S5. The method of generating two-dimensional code image data based on address information is a well-known method and will not be described herein. The two-dimensional code image is an example of the code image.

In step S5, the CPU 4 executes a second acquisition procedure prior to advancing to step S6. In the second acquisition procedure, the CPU 4 acquires the size (e.g., the tape width) of the printing medium mounted in the selected label printing device (in this case, the selected label printing device is the printing device 10). For example, the CPU 4 acquires the type of the cartridge 12 detected by the cartridge sensor 14 from the selected label printing device via the communication interface 7, and acquires the size of the printing medium mounted in the selected label printing device based on the acquired type of the cartridge 12. Alternatively, for example, the CPU 4 acquires the size of the printing medium inputted (specified) by the user via the operating unit 6 of the operation terminal 1.

In step S6 the CPU 4 executes a determination procedure based on the printing medium size (the size of the printing medium) acquired in step S5, the web page identification information (the title of the web page) acquired in step S3, and the two-dimensional code image data generated in step S4. In the determination procedure, the CPU 4 determines whether the two-dimensional code image represented by the two-dimensional code image data and the character string indicating the web page identification information (the title of the web page) can be arranged together within the printing area defined by the printing medium size (the tape width in this case). More specifically, in the present embodiment, the CPU 4 performs this determination by determining whether the two-dimensional code image data and the character string can be juxtaposed in an orthogonal direction within the printing area. The orthogonal direction is a direction orthogonal to the direction in which the characters in the character string are aligned.

If the CPU 4 determines in step S6 that the two-dimensional code image and the character string can be juxtaposed in the orthogonal direction within the printing area defined by the printing medium size (the tape width in this case) (S6: YES), in step S7 the CPU 4 generates first print data for printing the two-dimensional code image and the character string together on a single label, and subsequently advances to step S9. In other words, in step S7 the CPU 4 generates first print data including: the two-dimensional code image data for the two-dimensional code image representing the address of the web page; and character string image data for the character string indicating the web page identification information (the title of the web page).

However, if the CPU 4 determines in step S6 that the two-dimensional code image and the character string cannot be juxtaposed in the orthogonal direction within the printing area defined by the printing medium size (S6: NO), in step S8 the CPU 4 generates second print data for printing the two-dimensional code on a single label without printing the character string on the single label, and subsequently advances to step S9. In other words, in step S8 the CPU 4 generates second print data that includes the two-dimensional code image data for the two-dimensional code image representing the address of the web page but does not include character string image data for the character string indicating the site identification information (the title of the web page).

In step S9 the CPU 4 executes a first transmission procedure or a second transmission procedure. Specifically, in step S9 the CPU 4 executes the first transmission procedure when a YES determination has been made in step S6 (S6: YES), and executes the second transmission procedure when a NO determination has been made in step S6 (S6: NO). In the first transmission procedure, the CPU 4 transmits the first print data generated in step S7 to the selected label printing device (in this case, the printing device 10) via the communication interface 7 to cause the selected label printing device to execute a print based on the first print data, in the second transmission procedure, the CPU 4 transmits the second print data generated in step S8 to the selected label printing device (in this case, the printing device 10) via the communication interface 7 to cause the selected label printing device to execute a print based on the second print data.

While the selected label printing device (in this case, the printing device 10) is executing a printing process and when the selected label printing device completes a printing process, the selected label printing device can be controlled to provide status feedback to the operation terminal 1 via the communication interface 15 so that the operation terminal 1 can be kept informed of the printing status.

Thus, the label print data creating program is executed on the operation terminal 1, which is provided with the communication interface 7 for communicating with the printing devices 10 and 20 configured to print on printing media (labels L1 and L2). The label print data creating program, when executed by the CPU 4 of the operation terminal 1, causes the operation terminal 1 to perform: the first acquisition procedure (step S3) for acquiring address information and web page identification information included in the HTML data for a web page to be printed; the code generation procedure (step S4) for generating a two-dimensional code image representing the address information acquired in the first acquisition procedure; the second acquisition procedure (step S5) for acquiring the size of a printing medium (label L1 or L2) mounted in the printing device 10 or 20 via the communication interface 7 or for acquiring the size of a printing medium (label L1 or L2) inputted through the operating unit 6 of the operation terminal 1; the determination procedure (step S6) for determining whether the two-dimensional code image generated in the code generation procedure and the character string indicating the web page identification information acquired in the first acquisition procedure can be juxtaposed in an orthogonal direction within a printing area defined by the size of the printing medium (label L1 or L2) acquired in the second acquisition procedure, the orthogonal direction being orthogonal to the direction in which the characters in the character string are aligned; and the first transmission procedure (step S9) for transmitting first print data generated in step S7 for printing the two-dimensional code and the character string together on a single label to the printing device 10 or 20 via the communication interface 7 when determining in the determination procedure that the two-dimensional code and the character string can be juxtaposed in the orthogonal direction within the printing area.

In other words, the operation terminal 1 provided with the ROM 5b storing therein the label print data creating program is connected to and capable of communicating with the printing devices 10 and 20, which are configured to create labels (L1 and L2). According to the above-described embodiment, when the user of the operation terminal 1 wishes to print a web page currently displayed on the operation terminal 1, the user can print a two-dimensional code image representing the address information for the web page (i.e., the address or URL of the web page) on a label using the printing device 10 or 20.

In the first acquisition procedure, the CPU 4 acquires the address information and web page identification information included in the HTML data for the displayed web page. Then, in the code generation procedure, the operation terminal 1 generates a two-dimensional code image representing the address information acquired in the first acquisition procedure. In the subsequent second acquisition procedure, the CPU 4 acquires the size of the printing medium (the label L1 or L2) mounted in the printing device 10 or 20. In the determination procedure of step S6, the CPU 4 determines whether the two-dimensional code image and the character string indicating the web page identification information can be juxtaposed in an orthogonal direction within the printing area defined by the size acquired in the second acquisition procedure. Note that the orthogonal direction is orthogonal to the direction in which the characters of the character string are aligned.

Figure 5A:
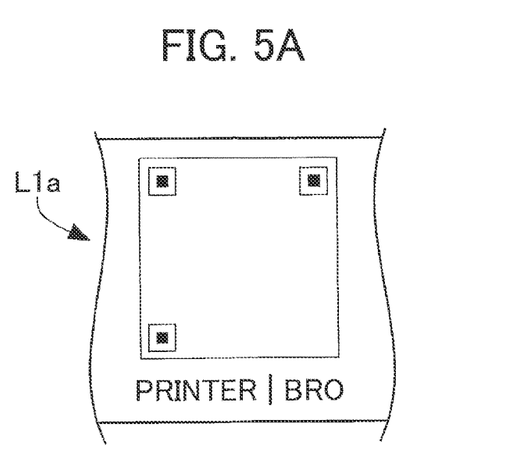
FIG. 5A is an explanatory view of an example of printing a code image for the address information and a character string for the web page identification information together on a tape.
Figure 5B:
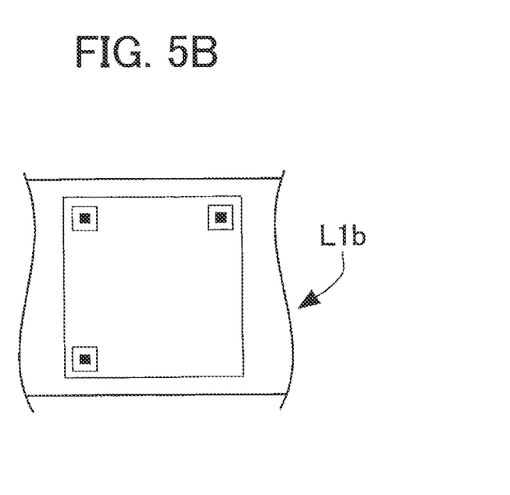
FIG. 5B is an explanatory view of an example of printing a code image for the address information on a tape without printing a character string for the web page identification information on the tape.

For example, in a case where a tape-like label L1 is created using the printing device 10, when the two-dimensional code image and the character string indicating the web page identification information can be juxtaposed in the orthogonal direction within the printing area, in the first transmission procedure the CPU 4 of the operation terminal 1 transmits, to the printing device 10, first print data including both two-dimensional code image data for the two-dimensional code image and character string image data for the character string indicating the site identification information. Accordingly, the printing device 10 can print a single label L1a having the two-dimensional code image representing the address information for the website and the character string indicating the web page identification information that are juxtaposed in the tape width direction (the up-down direction in FIG. 5A), as illustrated in FIG. 5A. Note that the two-dimensional code images shown in FIGS. 5A and 5B described later have been simplified for convenience. Further, the left-right direction in the drawings of FIGS. 5A and 5B represents the longitudinal direction of the tape-like printing medium.

Figure 6A:
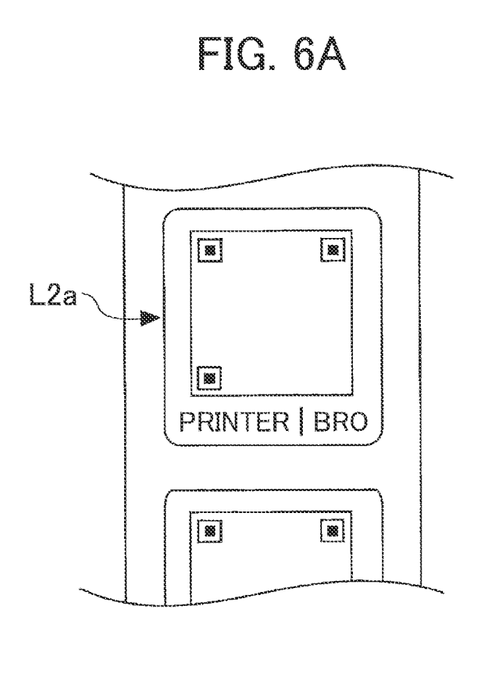
FIG. 6A is an explanatory view of an example of printing a code image for the address information and a character string for the web page identification information together on a die-cut label.
Figure 6B:
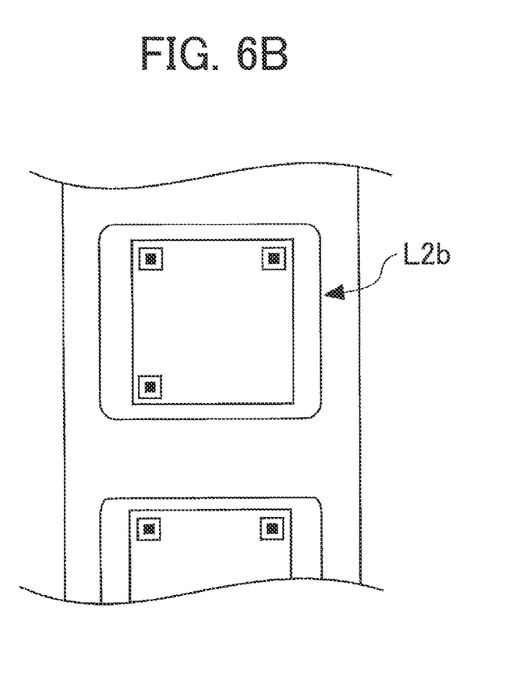
FIG. 6B is an explanatory view of an example of printing a code image for the address information on a die-cut label without printing a character string for the web page identification information on the die-cut label.

For example, in a case where a sheet-like label L2 is created using the printing device 20, when the two-dimensional code image and the character string for the web page identification information can be juxtaposed in the orthogonal direction within the printing area defined by the user-inputted size for the die-cut label, in the first transmission procedure the CPU 4 of the operation terminal 1 transmits, to the printing device 20, first print data including both two-dimensional code image data for the two-dimensional code image and character string image data for the character string indicating the web page identification information. Accordingly, the printing device 20 can print a single label L2a including the two-dimensional code image representing the address information for the web page and the character string indicating the web page identification information that are juxtaposed in the orthogonal direction (the up-down direction in FIG. 6A) in the printing area of the die-cut label, as illustrated in FIG. 6A. Note that the two-dimensional code images shown in FIGS. 6A and 6B described later have been simplified for convenience. Further, the up-down direction in the drawings of FIGS. 6A and 6B represents the longitudinal direction of the sheet-like printing medium.

Therefore, the operation terminal 1 according to the present embodiment can facilitate creation of labels L1a and L2a on which both a two-dimensional code image representing address information for a web page and a character string indicating web page identification information for that web page have been printed together.

Further, by creating a label after determining in the determination procedure of step S6 that the two-dimensional code image and the character string indicating the web page identification information can be juxtaposed within the printing area, the operation terminal 1 according to the embodiment can print a single label containing the two-dimensional code image and the character string for the web page identification information within the printing area.

The label print data creating program also causes the CPU 4 to execute the second transmission procedure (step S9) when determining in the determination procedure of step S6 that the two-dimensional code image and the character string for the web page identification information cannot be juxtaposed within the printing area. In the second transmission procedure, the CPU 4 transmits, to the printing device 10 or 20 via the communication interface 7, second print data for printing the two-dimensional code image on a single label without printing the character string on that single label.

In other words, when the CPU 4 determines that the two-dimensional code image and the character string indicating the web page identification information cannot be juxtaposed within the printing area, in the second transmission procedure the CPU 4 transmits, to the printing device 10 or 20, second print data that includes two-dimensional code image data for the two-dimensional code image but does not include character string image data for the character string indicating the web page identification information.

For example, in a case where a tape-like label L1 is created using the printing device 10, when the two-dimensional code image and the character string for the web page identification information cannot be juxtaposed in the printing area, in the second transmission procedure the CPU 4 transmits, to the printing device 10, second print data that includes two-dimensional code image data for the two-dimensional code image but does not include character string image data for the character string. Accordingly, as shown in FIG. 5B, the printing device 10 can print a single label L1b that includes the two-dimensional code image representing the address information for the web page but does not include the character string for the web page identification information.

Similarly, for example, in a case where a sheet-like label L2 is created using the printing device 20, when the two-dimensional code image and the character string for the web page identification information cannot be juxtaposed in the printing area, in the second transmission procedure the CPU 4 transmits, to the printing device 20, second print data that includes two-dimensional code image data for the two-dimensional code image but does not include character string image data for the character string. Accordingly, as shown in FIG. 6B, the printing device 20 can print a single label L2b that includes the two-dimensional code image representing the address information for the web page but does not include the character string for the web page identification information.

Accordingly, when there is insufficient space for printing the character string indicating the web page identification information and the two-dimensional code image as they are, the two-dimensional code image is printed but the character string is not printed, thereby avoiding an incomplete representation of information due to printing content missing from the printing area.

While the description has been made to the specific embodiment, it would be apparent to those skilled in the art that various modifications can be made thereto as described below. Note that, while both the printing devices 10 and 20 may be used in the following variations, the following description will focus on use of the printing device 10 for simplification.

(1) Automatic Character Size Reduction

For example, the label print data creating program may cause the CPU 4 to execute a size adjustment procedure when the CPU 4 determines in the determination procedure of step S6 that the two-dimensional code image and the character string cannot be arranged together within the printing area. In the size adjustment procedure, the CPU 4 modifies the size of the character string such that the character string and the two-dimensional code image can be arranged together within the printing area. Subsequently, the program may cause the CPU 4 to execute a third transmission procedure. In the third transmission procedure, the CPU 4 transmits, to the printing device 10 via the communication interface 7, third print data for printing the two-dimensional code image and the character string whose size has been modified in the size adjustment procedure on a single label. In this way, in the present modification, the third print data for printing the two-dimensional code image and the character string whose size has been modified in the size adjustment procedure on a single label is generated and then transmitted to the printing device 10.

In other words, when the CPU 4 determines that the two-dimensional code image and the character string for the web page identification information cannot be arranged together in the printing area, the CPU 4 executes the size adjustment procedure to modify the size of the character string for the web page identification information. In the third transmission procedure, the CPU 4 transmits, to the printing device 10, third print data that includes two-dimensional code image data for the two-dimensional code image and character string image data for the character string whose size has been adjusted in the size adjustment procedure.

Accordingly, when there is insufficient space for printing the two-dimensional code image and the character sting for the web page identification information as they are, the CPU 4 adjusts the size of the character string for the web page identification information to a size that can be arranged together with the two-dimensional code image within the printing area and prints this character string together with the two-dimensional code image. Thus, the operation terminal 1 according to the present modification can avoid an incomplete representation of information due to printing content missing from the printing area.

(2) User Confirmation for Character Size Reduction

Alternatively, the label print data creating program may cause the CPU 4 to execute a confirmation display procedure when determining in the determination procedure of step S6 that the two-dimensional code image and the character string for the web page identification information cannot be arranged together within the printing area. In the confirmation display procedure, the CPU 4 displays a confirmation message on the display unit 2 of the operation terminal 1 prompting the user to confirm whether to execute the size adjustment procedure for modifying the size of the character string. In other words, in the confirmation display procedure, the CPU 4 displays on the display unit 2 an inquiry as to whether to permit modifying the size of the character string indicating the web page identification information. If permission to modify the character size is inputted via the operating unit 6 in response to the confirmation display procedure, the CPU 4 may execute the size adjustment procedure and then execute the third transmission procedure to transmit the third print data to the printing device 10 via the communication interface 7.

In other words, when the CPU 4 determines that the two-dimensional code image and the character string for the web page identification information cannot be arranged together within the printing area, the CPU 4 performs the confirmation display procedure to confirm whether the user's wish is to modify the size of the character string for the web page identification information.

Accordingly, according to the present modification, when there is insufficient space for printing the character string for the web page identification information and the two-dimensional code image as they are, the user can select a desired one of the following two options: modifying the size of the character string for the web page identification information so that the character string can be printed together with the two-dimensional code image; and taking some other appropriate measure.

(3) Divided Printing

Further, the label print data creating program may cause the CPU 4 to execute an image division procedure when determining in the determination procedure of step S6 that the two-dimensional code image and the character string cannot be arranged together within the printing area. In the image division procedure, the CPU 4 divides an image that includes both the two-dimensional code image and the character string into a first image portion and a second image portion. Subsequently, the program may cause the CPU 4 to execute a fourth transmission procedure for transmitting, to the printing device 10 via the communication interface 7, fourth print data for printing the first image portion on a preceding first label and printing the second image portion on a subsequent second label. That is, in the present modification, the CPU 4 generates fourth print data that includes: print data for printing the first image portion; and print data for printing the second image portion. For example, in a case where the first image portion includes the two-dimensional code image representing the address information for the web page and the second image portion includes the character string indicating the web page identification information for that web page, the CPU 4 generates fourth print data that includes: print data for printing the two-dimensional code image on a single label; and print data for printing the character string on another single label.

In other words, when the CPU 4 determines that the two-dimensional code image and the character string for the web page identification information cannot be arranged together within the printing area, the CPU 4 generates the fourth print data for performing what is called a split print.

In this case, an image that includes the two-dimensional code image and the character string is divided into a first image portion and a second image portion. The fourth print data is data for printing the first image portion on a preceding first label and printing the second image portion on a subsequent second label. In response to the fourth print data being transmitted to the printing device 10 in the fourth transmission procedure, the printing device 10 first to create the first label including the first image portion and subsequently to create the second label including the second image portion.

By affixing the printed first label and printed second label adjacent to each other on the desired adherend such that the first image portion and second image portion form a continuous image, the user can obtain a label whose overall appearance depicts the two-dimensional code image arranged together with the character string for the web page identification information.

While the specific embodiment and modifications thereof have been described in detail, it would be apparent to those skilled in the art that many modifications and variations may be made thereto.

What is claimed is:

1. A non-transitory computer-readable storage medium storing computer-readable instructions for an information processing apparatus including a processor, the computer-readable instructions, when executed by the processor, causing the information processing apparatus to perform processing including:
   (a) acquiring an address of a web page currently displayed on a display of the information processing apparatus;
   (b) generating a code image representing the address acquired in the acquiring the address;
   (c) acquiring identification information from HTML data for the web page, the identification information being information for identifying the web page; and
   (d) generating print data for printing both the code image, generated in the generating the code image, and a character string indicating the identification information acquired in the acquiring the identification information.

2. The non-transitory computer-readable storage medium according to claim 1,
   wherein the computer-readable instructions, when executed by the processor, cause the information processing apparatus to perform further processing including:
   (e) acquiring identification information from HTML data for the web page, the identification information being information for identifying the web page;
   (e) acquiring a printing medium size that is a size of a printing medium mounted in a printing device; and
   (f) determining whether the code image, generated in the generating the code image, and the character string indicating the identification information, acquired in the acquiring the identification information, can be arranged together within a printing area defined by the printing medium size acquired in the acquiring the printing medium size, and wherein, in a case where determination is made, in the determining, that the code image and the character string can be arranged together within the printing area, the print data, generated in the generating the print data, is print data for printing both the code image and the character string on a single label.

3. The non-transitory computer-readable storage medium according to claim 2,
   wherein the determining is performed by determining whether the code image and the character string can be juxtaposed in an orthogonal direction within the printing area, the orthogonal direction being orthogonal to a direction in which characters in the character string are aligned.

4. The non-transitory computer-readable storage medium according to claim 2,
   wherein, in a case where determination is made, in the determining, that the code image and the character string cannot be arranged together within the printing area, the print data, generated in the generating the print data, is print data for printing the code image on the single label without printing the character string on the single label.

5. The non-transitory computer-readable storage medium according to claim 2,
   wherein the computer-readable instructions, when executed by the processor, cause the information processing apparatus to perform further processing including:
   (g) modifying, in a case where determination is made, in the determining, that the code image and the character string cannot be arranged together within the printing area, a size of the character string such that the code image and the character string can be arranged together within the printing area, and
   wherein, in a case where the modifying is performed, the print data, generated in the generating the print data, is print data for printing both the code image and the character string whose size has been modified, in the modifying, on the single label.

6. The non-transitory computer-readable storage medium according to claim 2,
   wherein the computer-readable instructions, when executed by the processor, cause the information processing apparatus to perform further processing including:
   (g) displaying, in a case where determination is made, in the determining, that the code image and the character string cannot be arranged together within the printing area, an inquiry as to whether to permit modifying a size of the character string on the display of the information processing apparatus; and
   (h) modifying, in a case where permission to modify the size of the character string is inputted in response to the inquiry displayed in the displaying via an operating unit of the information processing apparatus, the size of the character string such that the code image and the character string can be arranged together within the printing area, and
   wherein, in a case where the modifying is performed, the print data, generated in the generating the print data, is print data for printing both the code image and the character string whose size has been modified, in the modifying, on the single label.

7. The non-transitory computer-readable storage medium according to claim 2,
wherein, in a case where determination is made, in the determining, that the code image and the character string cannot be arranged together within the printing area, the print data, generated in the generating the print data, includes: print data for printing the code image on the single label; and print data for printing the character string on another single label.

8. The non-transitory computer-readable storage medium according to claim 1,
wherein the computer-readable instructions, when executed by the processor, cause the information processing apparatus to perform further processing including:
(e) acquiring a printing medium size inputted via an operating unit of the information processing apparatus, the printing medium size being a size of a printing medium mounted in a printing device; and
(f) determining whether the code image, generated in the generating the code image, and the character string indicating the identification information, acquired in the acquiring the identification information, can be arranged together within a printing area defined by the printing medium size acquired in the acquiring the printing medium size, and
wherein, in a case where determination is made, in the determining, that the code image and the character string can be arranged together within the printing area, the print data, generated in the generating the print data, is print data for printing both the code image and the character string on a single label.

9. The non-transitory computer-readable storage medium according to claim 8,
wherein the determining is performed by determining whether the code image and the character string can be juxtaposed in an orthogonal direction within the printing area, the orthogonal direction being orthogonal to a direction in which characters in the character string are aligned.

10. The non-transitory computer-readable storage medium according to claim 8,
wherein, in a case where determination is made, in the determining, that the code image and the character string cannot be arranged together within the printing area, the print data, generated in the generating the print data, is print data for printing the code image on the single label without printing the character string on the single label.

11. The non-transitory computer-readable storage medium according to claim 8,
wherein the computer-readable instructions, when executed by the processor, cause the information processing apparatus to perform further processing including:
(g) modifying, in a case where determination is made, in the determining, that the code image and the character string cannot be arranged together within the printing area, a size of the character string such that the code image and the character string can be arranged together within the printing area, and
wherein, in a case where the modifying is performed, the print data, generated in the generating the print data, is print data for printing both the code image and the character string whose size has been modified, in the modifying, on the single label.

12. The non-transitory computer-readable storage medium according to claim 8,
wherein the computer-readable instructions, when executed by the processor, cause the information processing apparatus to perform further processing including:
(g) displaying, in a case where determination is made, in the determining, that the code image and the character string cannot be arranged together within the printing area, an inquiry as to whether to permit modifying a size of the character string on the display of the information processing apparatus; and
(h) modifying, in a case where permission to modify the size of the character string is inputted in response to the inquiry displayed, in the displaying, via the operating unit of the information processing apparatus, the size of the character string such that the code image and the character string can be arranged together within the printing area, and
wherein, in a case where the modifying is performed, the print data, generated in the generating the print data, is print data for printing both the code image and the character string whose size has been modified, in the modifying, on the single label.

13. The non-transitory computer-readable storage medium according to claim 8,
wherein, in a case where determination is made, in the determining, that the code image and the character string cannot be arranged together within the printing area, the print data, generated in the generating the print data, includes: print data for printing the code image on the single label; and print data for printing the character string on another single label.

14. The non-transitory computer-readable storage medium according to claim 1,
wherein the computer-readable instructions, when executed by the processor, cause the information processing apparatus to perform further processing including:
(e) transmitting the print data, generated in the generating the print data, (c) to a printing device.

15. The non-transitory computer-readable storage medium according to claim 1,
wherein the computer-readable instructions, when executed by the processor, cause the information processing apparatus to perform further processing including:
(e) determining whether a printing device to be used to print the web page is a label printer configured to create a label by printing on a tape-like printing medium or a sheet-like printing medium,
wherein, in a case where determination is made, in the determining, that the printing device is the label printer, the acquiring the address; the generating the code image; the acquiring the identification information; and the generating the print data, are performed, and
wherein the computer-readable instructions, when executed by the processor, cause the information processing apparatus to perform further processing including:
(f) transmitting, in the case where determination is made, in the determining, that the printing device is the label printer, the print data, generated in the generating the print data, to the printing device; and
(g) transmitting, in a case where determination is made, in the determining, that the printing device is not the label printer, print data for printing an image of the web page to the printing device.

16. An information processing apparatus comprising:
a display; and
a controller configured to perform processing including:
  (a) acquiring an address of a web page currently displayed on the display of the information processing apparatus;
  (b) generating a code image representing the address acquired in the acquiring the address;
  (c) acquiring identification information from HTML data for the web page, the identification information being information for identifying the web page; and
  (d) generating print data for printing both the code image, generated in the generating the code image, and a character string indicating the identification information, acquired in the acquiring the identification information.

17. A method of generating print data for creating a label, the method comprising:
  (a) acquiring an address of a web page currently displayed on a display of an information processing apparatus;
  (b) generating a code image representing the address acquired in the acquiring the address;
  (c) acquiring identification information from HTML data for the web page, the identification information being information for identifying the web page; and
  (d) generating print data for printing both the code image, generated in the generating the code image, and a character string indicating the identification information, acquired in the acquiring the identification information.

18. A method of generating print data for creating a label, the method comprising:
  (a) acquiring an address of a web page currently displayed on a display of an information processing apparatus;
  (b) generating a code image representing the address acquired in the acquiring the address;
  (c) acquiring identification information from HTML data for the web page, the identification information being information for identifying the web page;
  (d) acquiring a printing medium size that is a size of a printing medium mounted in a printing device;
  (e) determining whether the code image, generated in the generating the code image, and a character string indicating the identification information, acquired in the acquiring the identification information can be arranged together within a printing area defined by the printing medium size acquired in the acquiring the printing medium size; and
  (f) generating, in a case where determination is made, in the determining, that the code image and the character string can be arranged together within the printing area, print data for printing both the code image and the character string on a single label.

19. A method of generating print data for creating a label, the method comprising:
  (a) acquiring an address of a web page currently displayed on a display of an information processing apparatus;
  (b) generating a code image representing the address acquired in the acquiring the address;
  (c) acquiring identification information from HTML data for the web page, the identification information being information for identifying the web page;
  (d) acquiring a printing medium size inputted via an operating unit of the information processing apparatus, the printing medium size being a size of a printing medium mounted in a printing device;
  (e) determining whether the code image, generated in the generating the code image, and a character string indicating the identification information, acquired in the acquiring the identification information, can be arranged together within a printing area defined by the printing medium size acquired in the acquiring the printing medium size; and
  (f) generating, in a case where determination is made, in the determining, that the code image and the character string can be arranged together within the printing area, print data for printing both the code image and the character string on a single label.

20. A method of generating print data for creating a label, the method comprising:
  (a) determining whether a printing device to be used to print a web page currently displayed on a display of an information processing apparatus is a label printer configured to create a label by printing on a tape-like printing medium or a sheet-like printing medium;
  in a case where determination is made, in the determining, that the printing device is the label printer:
    (b) acquiring an address of the web page;
    (c) generating a code image representing the address acquired in the acquiring the address;
    (d) generating print data for printing the code image generated in the generating the code image;
    (e) transmitting the print data, generated in the generating the print data, to the printing device; and
  in a case where determination is made, in the determining, that the printing device is not the label printer:
    (f) transmitting print data for printing an image of the web page to the printing device.

* * * * *